United States Patent
Wang

(10) Patent No.: US 9,046,215 B2
(45) Date of Patent: Jun. 2, 2015

(54) SUPPORT DEVICE

(71) Applicants: Inventec (Pudong) Technology Corporation, Shanghai (CN); INVENTEC CORPORATION, Taipei (TW)

(72) Inventor: Jhao-Ming Wang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 116 days.

(21) Appl. No.: 13/765,221

(22) Filed: Feb. 12, 2013

(65) Prior Publication Data
US 2014/0117175 A1    May 1, 2014

(30) Foreign Application Priority Data
Oct. 31, 2012    (CN) .......................... 2012 1 0429490

(51) Int. Cl.
| | |
|---|---|
| *F16M 11/18* | (2006.01) |
| *F16M 11/04* | (2006.01) |
| *F16M 11/10* | (2006.01) |
| *F16M 13/00* | (2006.01) |

(52) U.S. Cl.
CPC .......... *F16M 11/041* (2013.01); *F16M 11/105* (2013.01); *F16M 13/00* (2013.01)

(58) Field of Classification Search
CPC .... F16M 11/041; F16M 11/105; F16M 13/00
USPC .............. 248/176.3, 671, 371, 398, 138, 139, 248/140, 13; 108/8
See application file for complete search history.

(56) References Cited

U.S. PATENT DOCUMENTS

| | | | | |
|---|---|---|---|---|
| 1,295,680 | A * | 2/1919 | Benson | 108/4 |
| 4,928,914 | A * | 5/1990 | Snodell | 248/284.1 |
| 4,947,763 | A * | 8/1990 | Piorek | 108/8 |
| 5,460,104 | A * | 10/1995 | Young, Sr. | 108/115 |
| 6,227,518 | B1 * | 5/2001 | Sun | 248/371 |
| 8,087,629 | B2 * | 1/2012 | Gotovac | 248/299.1 |
| 8,505,470 | B1 * | 8/2013 | Lira | 108/138 |
| 8,708,298 | B2 * | 4/2014 | Hu et al. | 248/371 |

* cited by examiner

*Primary Examiner* — Anita M King
(74) *Attorney, Agent, or Firm* — Morris Manning & Martin LLP; Tim Tingkang Xia, Esq.

(57) ABSTRACT

A support device, applicable for holding up an electronic device in different directions, the support device includes a base and a curved sliding bracket. The base includes a fixing part. The curved sliding bracket is slidably assembled on the base in a curve direction. The electronic device is adapted for being fixed on the curved sliding bracket. The base includes a sliding rail, where the curved sliding bracket is assembled.

8 Claims, 12 Drawing Sheets

SUPPORT DEVICE

CROSS-REFERENCE TO RELATED APPLICATIONS

This non-provisional application claims priority under 35 U.S.C. §119(a) on Patent Application No(s). 201210429490.8 filed in China on Oct. 31, 2012, the entire contents of which are hereby incorporated by reference.

BACKGROUND OF THE INVENTION

1. Technical Field of the Invention

This disclosure relates to a support device, and in particularly to a support device enabling an electronic device to be erected in different directions.

2. Description of the Related Art

In today's information age, mankind's dependence on electronic devices is increasingly growing. Electronic devices are designed to be lighter and thinner gradually so as to be portable for users. Therefore, smart phones, tablet computers and other electronic devices have become the mainstream and an indispensable tool in people's modern life.

Currently, when viewing the screen of an electronic device, users need to hold it by hand, which is inconvenient for long-time viewing. Although a number of supporting devices are available now in the market, most of them can support electronic devices in only one position (e.g. only in a vertical or a longitudinal position) as most screens of electronic devices are rectangular, so it is hard to meet the demand users for viewing from different positions.

SUMMARY OF THE INVENTION

An embodiment of the disclosure provides a support device applicable for holding up an electronic device in different directions. The support device comprises a base and a curved sliding bracket. The base includes a fixing part. The curved sliding bracket is slidably assembled on the base in a curve direction. The electronic device is adapted for being fixed on the curved sliding bracket. The base includes a sliding rail, where the curved sliding bracket is assembled.

BRIEF DESCRIPTION OF THE DRAWINGS

The disclosure will become more fully understood from the detailed description given herein below for illustration only, and thus does not limit the disclosure, wherein.

DETAILED DESCRIPTION

Figure 1A:
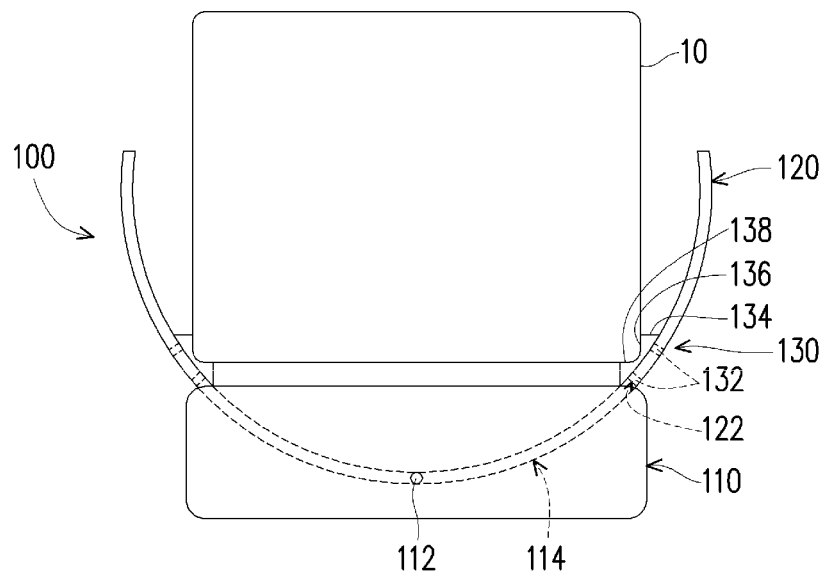
FIG. 1A is a schematic view of a support device holding up an electronic device in an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A support device 100 of this disclosure is applicable for holding up an electronic device 10 in different positions. FIG. 1A is a schematic view of a support device holding up an electronic device in one of the embodiments of this disclosure. Please refer to FIG. 1A, the support device 100 in this disclosure comprises a base 110 and a curved sliding bracket 120. The base 110 comprises a fixing part 112 and a sliding rail 114. In this embodiment, the sliding rail 114 is assembled in a curve direction. The curved sliding bracket 120 is slidably assembled in the sliding rail 114, to slide left and right along the inner outline of the sliding rail 114. In this embodiment, the electronic device 10 is a tablet computer, but in other embodiments, the electronic device 10 is a smart phone and so on.

Figure 1B:
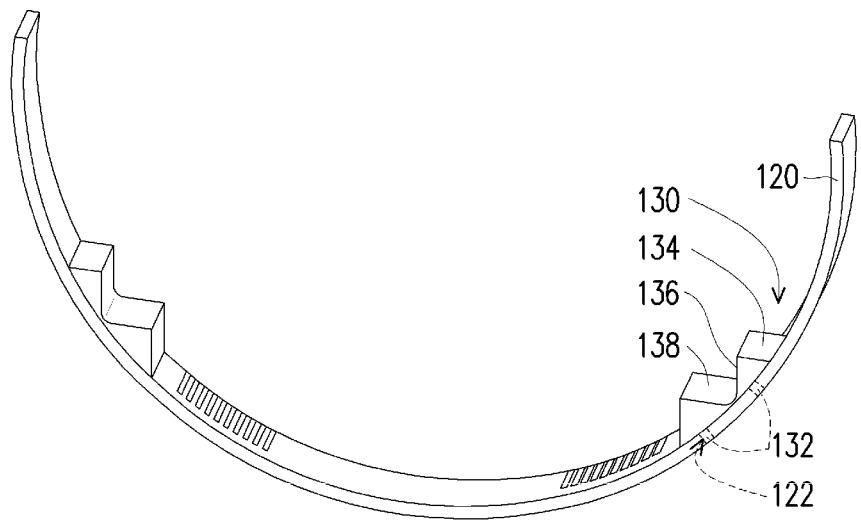
FIG. 1B is a schematic view of a curved sliding bracket and clamps of the support device in FIG. 1A.
Figure 1C:
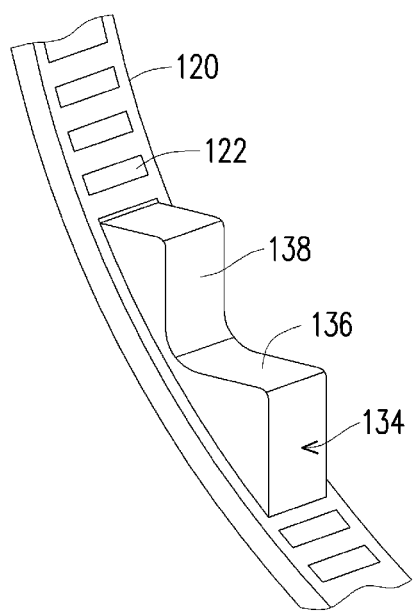
FIG. 1C is a partial enlarged view of FIG. 1B.
Figure 1D:
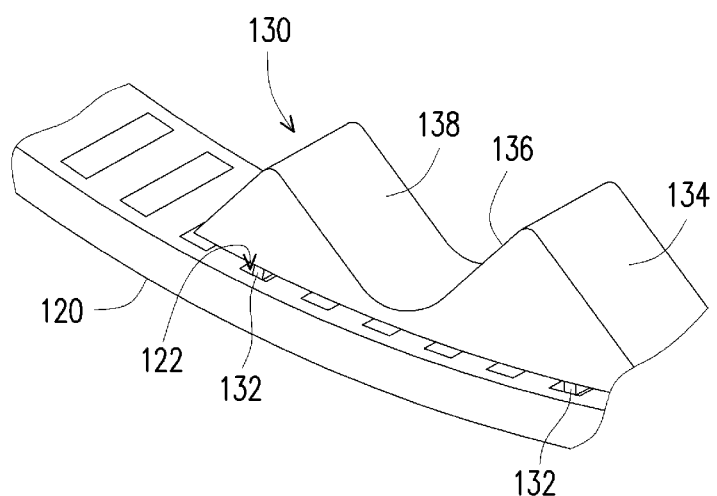
FIG. 1D is a partial enlarged view of FIG. 1C.

FIG. 1B is a schematic view of for the curved sliding bracket and clamps of the support device in FIG. 1A; FIG. 1C is a partial enlarged view of FIG. 1B; and FIG. 1D is a partial enlarged view of FIG. 1C. Please refer to FIG. 1B to FIG. 1D, in this embodiment, the support device 100 further comprises a couple of clamps 130. Each of the clamps 130 includes a first embedded part 132. The curved sliding bracket 120 includes a plurality of second embedded parts 122 corresponding to the first embedded parts 132. The clamps 130 are retained on one of the plurality of second embedded parts 122 via the first embedded parts 132, so as to be fixed on the curved sliding bracket 120.

In this embodiment, the first embedded part 132 is a protruding piece which is adapted for being adjustably fixed to the second embedded part 122. The plurality of second embedded parts 122 are holes. Users can choose which the plurality of second embedded parts 122 the first embedded parts 132 will be fixed depending on the dimension of the electronic device 10 that is to be placed. If the dimension of the electronic device 10 is small, users can adjust the distance between the first embedded parts to be shorter, that is, fix the first embedded parts 132 at the lower positions in FIG. 1A. On the other hand, if the dimension is big, users can fix the couple of first embedded parts 132 at the upper positions in FIG. 1A, that is, the distances between the clamps 130 becomes bigger. Certainly, in other embodiments, the clamps 130 are fixed to the curved sliding bracket 120 in a locking or a gluing way, and the ways of fixing the clamps 130 to the curved sliding bracket 120 are not limited to this embodiment.

In addition, as shown in FIG. 1C, the clamps 130 respectively include an elastic part 134, made of rubber or a plastic material. The elastic part 134 includes a first surface 136 and a second surface 138. In this embodiment, the first surface 136 is substantially perpendicular to the second surface 138. The distance between the clamps 130 can be slightly less than the width of the electronic device 10. When placed on the clamps 130, the electronic device 10 slightly expands the elastic parts 134 of the clamps 130, so as to be clamped tightly by the clamps 130. At this moment, both the first surface 136 and the second surface 138 of the elastic part 134 contact the electronic device 10 and limit the electronic device 10 to only move in the normal directions of the first surface 136 and the second surface 138.

Figure 1E:
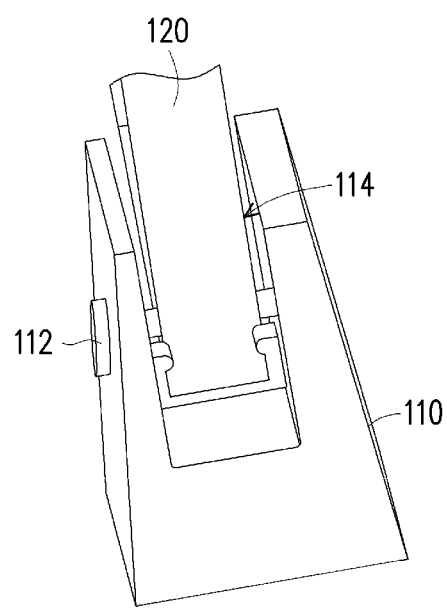
FIG. 1E is a side view of a fixing part and the curved sliding bracket of the supporting device in FIG. 1A.

FIG. 1E is a side view of the fixing part and the curved sliding bracket of the supporting device in FIG. 1A. Please refer to FIG. 1E, in this embodiment, the fixing part 112 is a pushbutton. When the curved sliding bracket 120 is moved to a certain position relative to the base, users can push the fixing part 112 to a fixed position, so that the fixing part 112 may stretch into the sliding rail 114 and support the curved sliding bracket 120. Therefore, the curved sliding bracket 120 may not slide relative to the base 110, and thus the position of the electronic device 10, relative to the base 110, may be fixed. Certainly, the above-mentioned type of the fixing part 112 is not limited to this embodiment. In other embodiments, the fixing part 112 is a knob, which is adapted for stretching into the sliding rail 114 by turning so as to support and to fix the curved sliding bracket 120. Certainly, the fixing part 112 may also be other elements inserted into the gap between the fixing part and the sliding rail 114 to increase the friction between them.

Figure 1F:
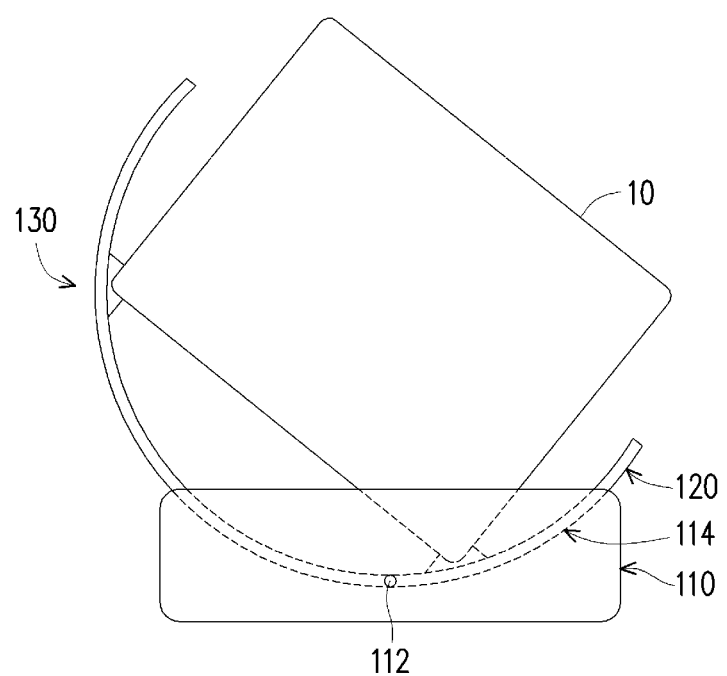
FIG. 1F to FIG. 1H show the process of the curved sliding bracket of the support device sliding counterclockwise in FIG. 1.
Figure 1G:
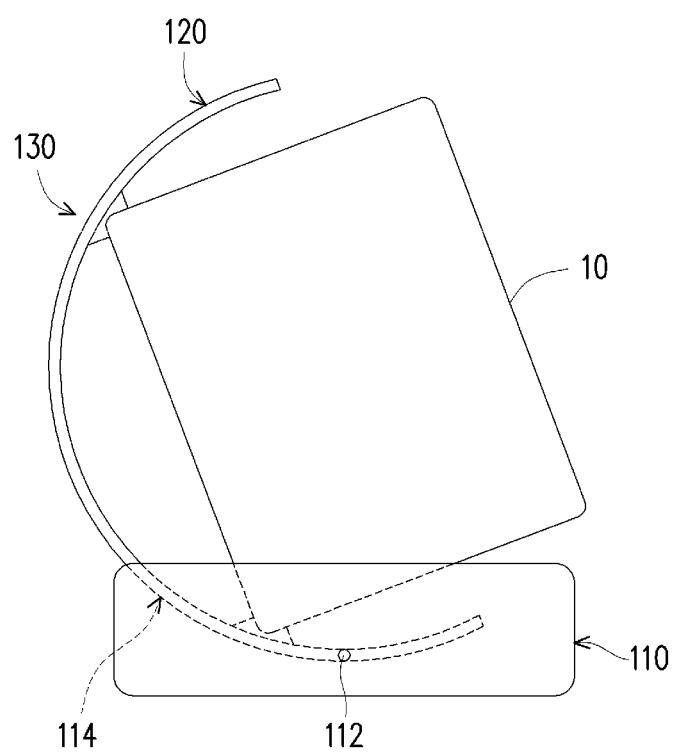
Figure 1H:
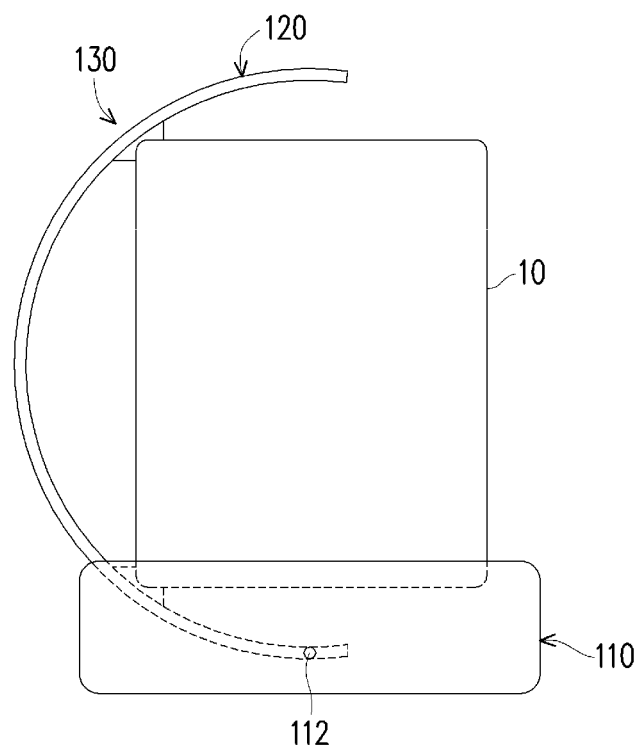

Conversely, if the curved sliding bracket 120 is needed to slide relative to the base 110, the fixing part 112 is required to move to a release position. In this embodiment, the fixing part 112 is withdrawn or ejected from the sliding rail 114 only by pressing it again, in order to release the pressure upon the curved sliding bracket 120. In this way, the curved sliding bracket 120 is adapted for sliding relative to the base 110, thereby changing the position of the electronic device 10 relative to the base 110. In FIG. 1A, the electronic device 10 is placed horizontally on the support device 100; if upright viewing the screen is needed, users can move the fixing part 112 to the release position, then change the position of the electronic device 10 with following ways. FIG. 1F to FIG. 1H show processes of the curved sliding bracket of the support device sliding counterclockwise. Please refer to FIG. 1F to FIG. 1H, users can change the position of the electronic device 10 to an upright position, relative to the base 110, by turning the curved sliding bracket 120. Alternatively, when another different viewing angle is needed, users can also maintain the electronic device 10 at the position of FIG. 1F or FIG. 1G. When the electronic device 10 is moved to the certain direction, the position of the curved sliding bracket 120, relative to the base 110, is fixed only by pressing the fixing part 112 again, that is, the electronic device 10 is retained to be viewed, without holding it by hand.

Figure 1I:
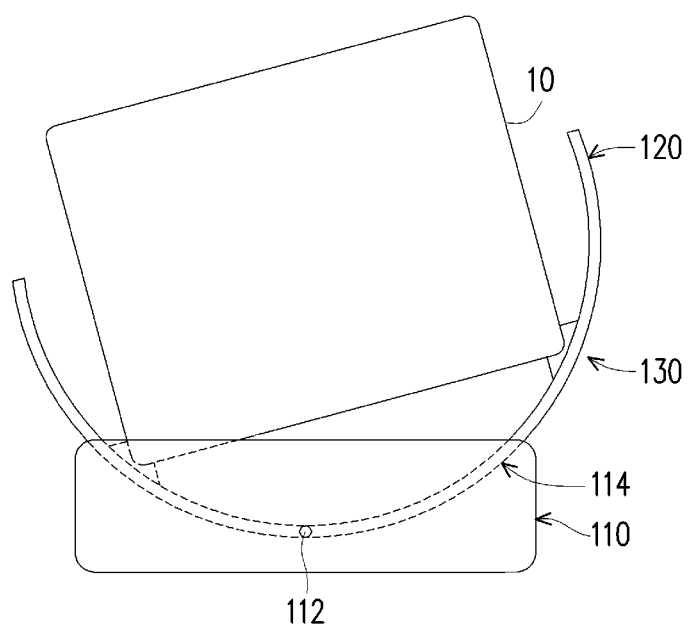
FIG. 1I to 1K show the process of the curved sliding bracket of the support device sliding clockwise in FIG. 1.
Figure 1J:
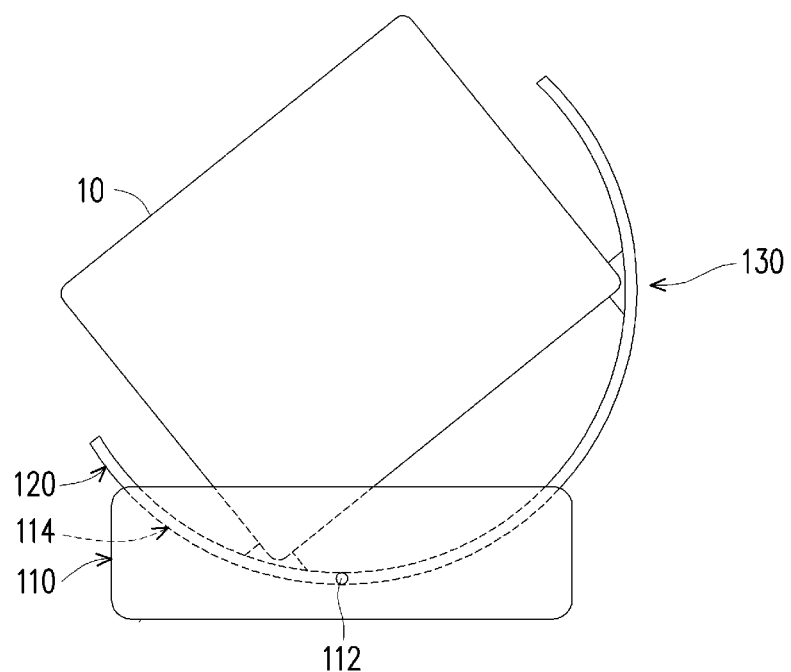
Figure 1K:
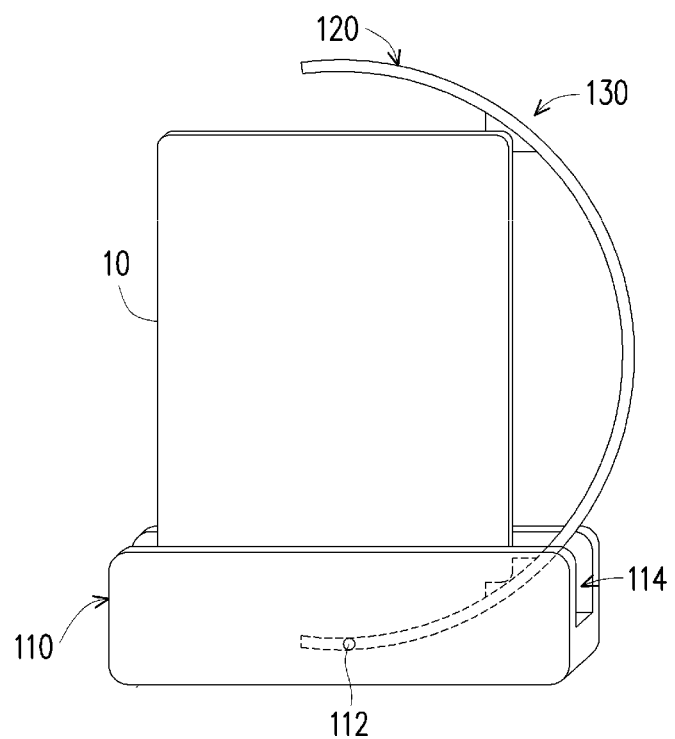

In view of some electronic devices 10 provided with keys or touch buttons at the edges of screen, users may differentiate the upright mode and the upside-down mode of the electronic device 10, even both modes are identified as a vertical mode, for example, when operated in the upright mode, the buttons are located below the screen, or the buttons are above the screen when operated in the upside-down mode. For the support device in this embodiment, the position of the electronic device 10 may be freely switched among the vertical direction (upright), the horizontal direction and the vertical direction (upside-down). In addition to the way of sliding the sliding bracket 120 counterclockwise, like the mode in FIG. 1F to 1H, the user can use another mode as follows. FIG. 1I to 1K show the processes of the curved sliding bracket of the support device sliding clockwise in FIG. 1A. Please refer to FIG. 1I to FIG. 1K, the users can slide the sliding bracket 120 clockwise relative to the base 110, until the sliding bracket 120 is moved to the position in FIG. 1K. When the electronic device 10 is moved to the certain position, the position of the curved sliding bracket 120, relative to the base 110, may be fixed only by pressing the fixing part 112 again, that is, the electronic device 10 is retained.

Figure 1L:
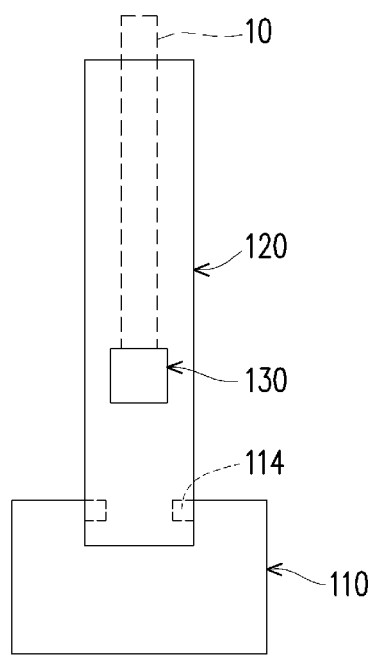
FIG. 1L is a side view for the support device in FIG. 1A.
Figure 2A:
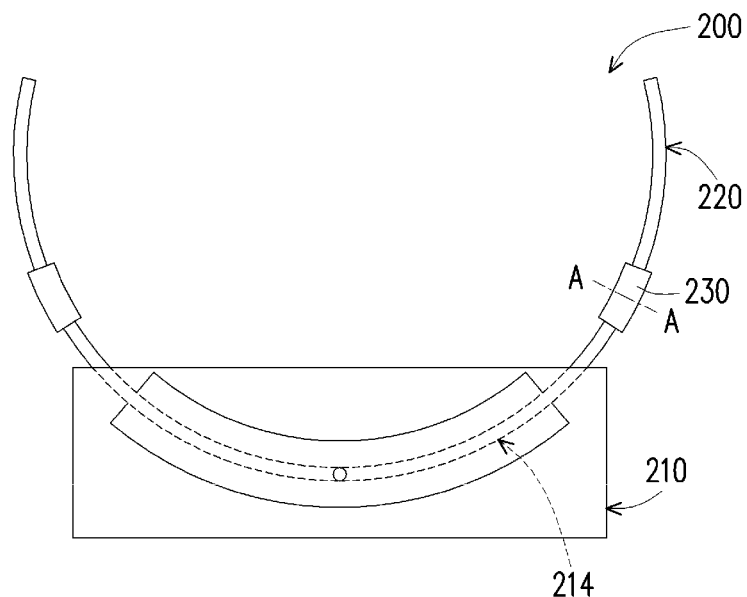
FIG. 2A is a schematic view of a support device according to another embodiment of the disclosure.
Figure 2B:
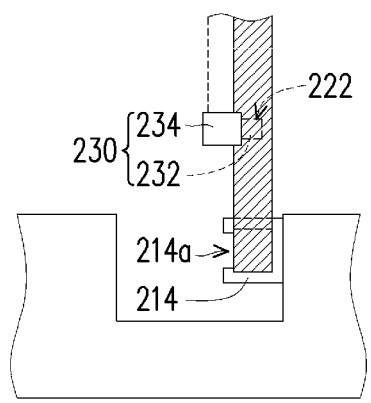
FIG. 2B is a side view of the support device in FIG. 2A.

FIG. 1L is a side view of the support device in FIG. 1A; FIG. 2A is a schematic view of a support device according to an embodiment of the disclosure; and FIG. 2B is a side view of the support device in FIG. 2A. Please refer to FIG. 1L to FIG. 2B, the difference between the support device 200 in FIG. 2A and the support device 100 of FIG. 1A lies in that, in FIG. 1L, the clamps 130 are located on the curved sliding bracket 120. However, in FIG. 2B, the clamps 230 are located on the side of the curved sliding bracket 220. Therefore, the electronic device 10 is disposed above the curved sliding bracket 120 when placed on the support device 100 in FIG. 1A, whereas the electronic device 10 is disposed at a lateral side of the curved sliding bracket 220 when placed on the curved sliding bracket 220 of FIG. 2A.

Moreover, when the curved sliding bracket 220 slides relative to the base 210, the clamps 230 may run into the sliding rail 214, leading to unsuccess of smooth rotation at times. As shown in FIG. 2B, in this embodiment, in order to solve the above-mentioned problem, the sliding rail 214 of the base 210 includes a side gap 214*a*. When the curved sliding bracket 220 slides relative to the base 210, the clamps 230 pass through the side gap 214*a* without running into the sliding rail 214.

Figure 2C:
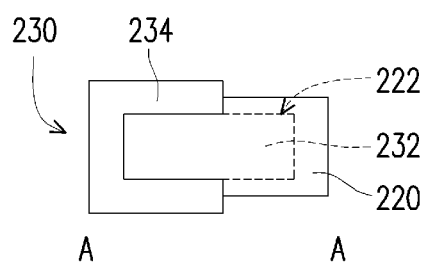
FIG. 2C is a sectional view of the support device along a line A-A in FIG. 2A.

FIG. 2C is a sectional view of the support device along a line segment A-A in FIG. 2A. Please refer to FIG. 2C, in this embodiment, the clamps 230 are inserted into the curved sliding bracket 220 at a lateral direction, that is, the second embedded parts 222 of the curved sliding bracket 220 are arranged laterally, in order to accommodate the first embedded parts 232. Additionally, the elastic parts 234 partially cover the first embedded parts 232. In this embodiment, the portions of the first embedded parts 232 that are not covered by the elastic parts 234 are inserted to the second embedded parts 222 of the curved sliding bracket 220, while the covered portions of the first embedded parts 232 are adapted for clamping the electronic device 10.

To sum up, the electronic device is clamped between the elastic parts of the couple of clamps, and the first embedded part of the clamp is fixed to the second embedded part of the curved sliding bracket, so that the electronic device is applicable for being be detachably fixed on the curved sliding bracket. The curved sliding bracket, slidably assembled on the sliding rail of the base, is adapted for sliding relative to the curve of the base. Users can adjust the curved sliding bracket to a certain position, then the fixing part is stretched into the sliding rail and support the curved sliding bracket, so as to fix the relative positions of the curved sliding bracket and the base, and thus the electronic device is held up in several positions (e.g., upright, upside-down or horizontal position), so as to meet the demand of users for viewing the electronic device located at different positions. Furthermore, users can fix the first embedded part to the second embedded part of the curved sliding bracket with a corresponding size, depending on the dimensions of the electronic device, so as to adjust the distance between the clamps. In this way, the support device of this disclosure may be used for electronic devices with various dimensions.

What is claimed is:

1. A support device, applicable for holding up an electronic device in different directions, the support device comprising:
   a base including a fixing part;
   a couple of clamps, each of the clamps including a first embedded part; and
   a curved sliding bracket slidably assembled on the base in a curve direction and including at least one second embedded part corresponding to each first embedded part, the clamps being retained on the at least one second embedded part respectively via the first embedded part so as to be fixed on the curved sliding bracket, the electronic device being adapted for being fixed on the curved sliding bracket, wherein the base includes a sliding rail, where the curved sliding bracket is assembled.

2. The support device according to claim 1, wherein each of the clamps includes a first surface and a second surface, wherein when the electronic device is fixed on the curved sliding bracket, both the first surface and the second surface contact the electronic device and limit the electronic device to move in the normal direction of the first surface and the normal direction of second surface.

3. The support device according to claim 2, wherein each of the clamps includes an elastic part partially covering the first embedded part, and each of the elastic parts including the first surface and the second surface.

4. The support device according to claim 2, wherein in each of the clamps, the first surface is substantially perpendicular to the second surface.

5. The support device according to claim 1, wherein the number of the at least one second embedded part is plural, the plurality of first embedded parts are protruding pieces, the plurality of second embedded parts are holes, and each of the plurality of first embedded parts is adapted for being adjustably fixed to one of the plurality of second embedded parts.

6. The support device according to claim 1, wherein the base includes a side gap, when the curved sliding bracket slides relative to the base, the clamps pass through the side gap.

7. The support device according to claim 1, wherein when the fixing part includes a pushbutton or a knob, the pushbutton or the knob is adapted for pushing or turning the fixing part to move to a fixed position, so as to stretch into the sliding rail and to support the curved sliding bracket.

8. The support device according to claim 7, wherein the sliding rail is assembled in the curve direction.

\* \* \* \* \*